US012644905B2

(12) United States Patent
Beck et al.

(10) Patent No.: US 12,644,905 B2
(45) Date of Patent: Jun. 2, 2026

(54) VEHICLE SENSOR RATIONALIZATION

(71) Applicant: FCA US LLC, Auburn Hills, MI (US)

(72) Inventors: Stephanie R Beck, Pinckney, MI (US);
Roger C Sager, Munith, MI (US);
Scott E Henson, Chelsea, MI (US);
Anthony N Gorney, Oxford, MI (US)

(73) Assignee: FCA US LLC, Auburn Hills, MI (US)

( * ) Notice: Subject to any disclaimer, the term of this patent is extended or adjusted under 35 U.S.C. 154(b) by 279 days.

(21) Appl. No.: 18/498,121

(22) Filed: Oct. 31, 2023

(65) Prior Publication Data

US 2025/0138046 A1 May 1, 2025

(51) Int. Cl.
*G01P 21/00* (2006.01)
*B62D 15/02* (2006.01)
*G01B 21/22* (2006.01)

(52) U.S. Cl.
CPC ............ *G01P 21/00* (2013.01); *B62D 15/021* (2013.01); *G01B 21/22* (2013.01)

(58) Field of Classification Search
CPC ........ G01P 21/00; B62D 15/021; G01B 21/22
USPC ..................... 73/1.37–1.39, 1.75; 356/243.1;
340/425.5, 438, 467; 324/200, 202
See application file for complete search history.

(56) References Cited

FOREIGN PATENT DOCUMENTS

GB          2368400 A  *  5/2002  .............. G01P 15/18

* cited by examiner

*Primary Examiner* — Robert R Raevis
(74) *Attorney, Agent, or Firm* — Jeremy J. Klobucar

(57) ABSTRACT

A method of rationalizing a sensor of a vehicle is provided. The method includes the steps of receiving an output from a wheel speed sensor, receiving an output from a lateral accelerometer, receiving an output from a steering angle sensor, determining whether an evaluation event exists based on the output from the wheel speed sensor, evaluating one of the steering angle sensor output or the lateral accelerometer sensor output during the evaluation event, and determining whether the other of the steering angle sensor output or the lateral accelerometer sensor output exceeds a test threshold value during the evaluation event.

17 Claims, 4 Drawing Sheets

VEHICLE SENSOR RATIONALIZATION

FIELD

The present disclosure relates to rationalizing vehicle sensors and, more particularly, rationalizing a steering angle sensor with a lateral accelerometer and/or rationalizing the lateral accelerometer with the steering angle sensor.

BACKGROUND

Vehicles include a propulsion system that drives the vehicle wheels, resulting in vehicle acceleration. Vehicle speed and acceleration may be measured by sensors and the data generated by the sensors may be provided to one or more vehicle systems. A need exists to rationalize or verify the operational status of the sensors to ensure the sensors are functioning properly.

SUMMARY

In at least some implementations, a method of rationalizing a sensor of a vehicle, includes receiving an output from a wheel speed sensor, a lateral accelerometer, and a steering angle sensor, determining whether an evaluation event exists based on the output from the wheel speed sensor, evaluating one of the steering angle sensor output or the lateral accelerometer sensor output during the evaluation event, and determining whether the other of the steering angle sensor output or the lateral accelerometer sensor output exceeds a test threshold value during the evaluation event.

In at least some implementations, the evaluation event exists when the output from the wheel speed sensor exceeds an evaluation threshold. In at least some implementations, the evaluation threshold is zero.

In at least some implementations, the lateral accelerometer sensor is determined to be malfunctioning when the steering angle sensor output indicates a steering maneuver and the lateral accelerometer sensor evaluation value does not exceed the test threshold value for the lateral accelerometer. In at least some implementations, the test threshold is greater than zero by at least a nominal noise value for the lateral accelerometer sensor output. In at least some implementations, the method further includes providing an indication of an error when the lateral accelerometer sensor output does not exceed the test threshold during the evaluation event. In at least some implementations, the first threshold does not vary as a function of the magnitude of the output of the steering angle sensor output.

In at least some implementations, the lateral accelerometer sensor is determined to not be malfunctioning when the steering angle sensor output indicates a steering maneuver and the lateral accelerometer sensor output exceeds the test threshold value for the lateral accelerometer. In at least some implementations, the steering angle sensor is determined to be malfunctioning when the lateral accelerometer sensor output indicates a change in acceleration and the steering angle sensor output does not exceed the test threshold for the steering angle sensor. In at least some implementations, the test threshold value is greater than zero by at least a nominal noise value for the steering angle sensor output. In at least some implementations, the method further includes providing an indication of an error when the steering angle sensor output does not exceed the test threshold during the evaluation event. In at least some implementations, the test threshold does not vary as a function of the magnitude of the output of the lateral accelerometer sensor output.

In at least some implementations, the steering angle sensor is determined to not be malfunctioning when the lateral accelerometer sensor output indicates a change in acceleration and the steering angle sensor output exceeds the test threshold.

In at least some implementations, a vehicle system includes a wheel speed sensor adapted to sense a wheel speed and to provide an output indicative of the magnitude of wheel speed, a lateral accelerometer adapted to sense an acceleration of a vehicle and to provide an output indicative of the magnitude of vehicle acceleration, a steering angle sensor adapted to provide steering wheel data and provide an output indicative of steering wheel position, and a controller communicatively coupled with the wheel speed sensor, the lateral accelerometer, and the steering angle sensor. The controller is adapted to receive an output from the wheel speed sensor, receive an output from the lateral accelerometer, receive an output from the steering angle sensor, determine whether an evaluation event exists that exceeds an evaluation event value based on the output from the wheel speed sensor, evaluate one of the steering angle sensor output or the lateral accelerometer sensor output during the evaluation event, and determine whether the other of the steering angle sensor output or the lateral accelerometer sensor output exceeds a non-zero value during the evaluation event.

In at least some implementations, the vehicle includes multiple wheels and a separate wheel speed sensor is provided for each wheel of the vehicle.

In at least some implementations, the non-zero values are test thresholds greater than zero. In at least some implementations, the test thresholds do not vary as a function of the magnitude of the output of the wheel speed sensor.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
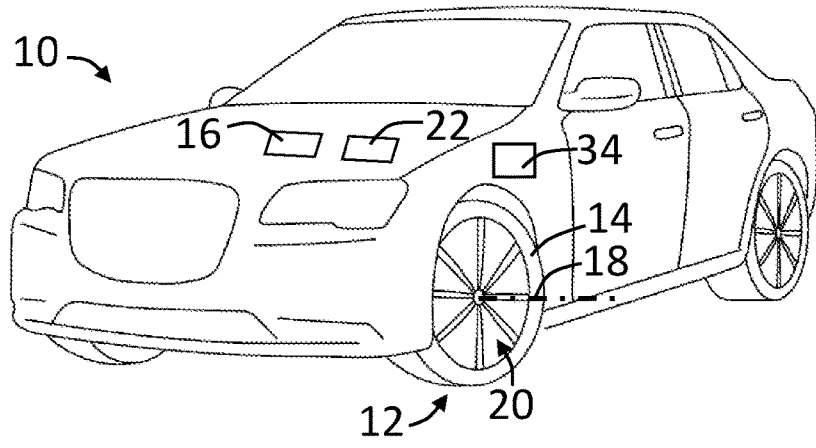
FIG. 1 is a perspective view of a vehicle.

Referring in more detail to the drawings, FIG. 1 illustrates a vehicle 10 that includes multiple wheels 12, and a propulsion system 16 including a motor, an engine, and/or a transmission that provides torque to the wheels 12 to rotate the wheels about an axis of rotation 18 and accelerate the vehicle 10. The vehicle 10 may also include a brake or brake assembly 20 to decelerate the vehicle 10. Vehicle speed and acceleration may be determined by one or more wheel speed sensors 28 (FIG. 2) and a lateral accelerometer 30. Additionally, steering angle may be determined by one or more steering angle sensors 32. These sensors, among other things, may be communicatively coupled with a controller 22 or control system (e.g., an engine control module). The controller 22 and sensors 28, 30, 32 may be used in control of one or move vehicle functions or systems, like anti-lock brakes, vehicle stability control and the like. The controller 22 may be arranged to receive sensor information and provide information to another system to, for example, trigger diagnostic fault codes for a user in the event of a malfunction of a vehicle component or system (e.g., a malfunctioning vehicle lateral accelerometer or steering angle sensor). The controller 22 may include a memory 24 for storing data from the one or more sensors and a processor 26 for processing the data stored in the memory.

In order to perform the functions and desired processing set forth herein, as well as the computations therefore, the controller 22 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 22 may include input signal processing and filtering to enable accurate sampling and conversion or acquisitions of such signals from communications interfaces and sensors. As used herein the terms controller 22 may refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
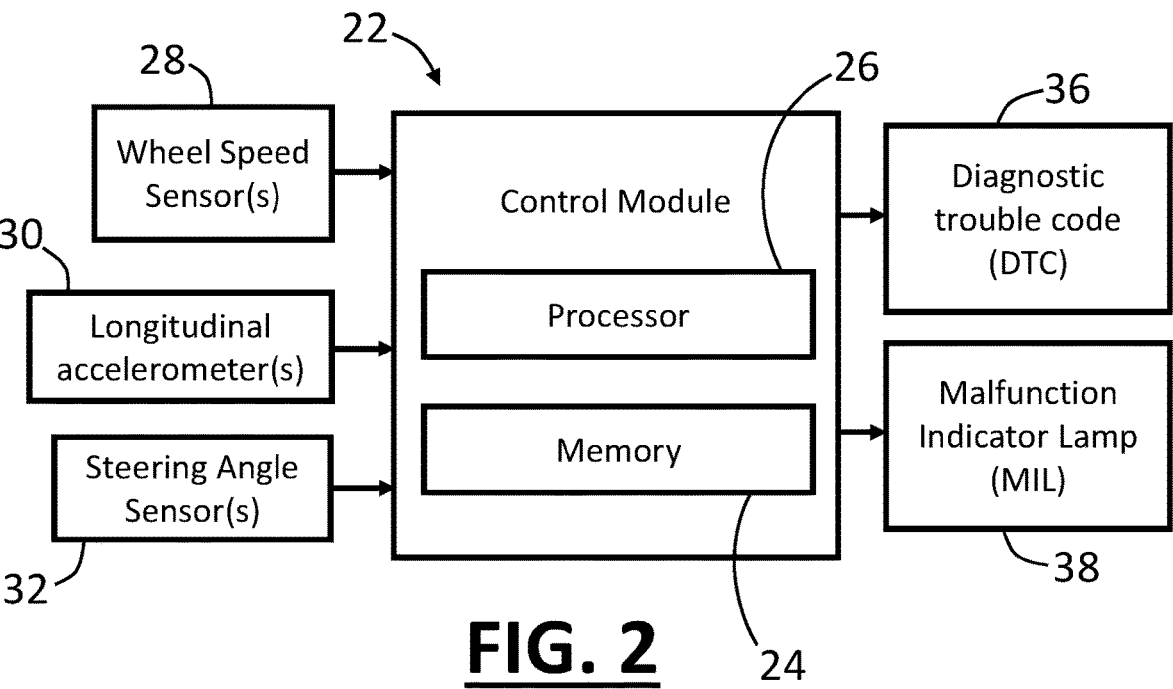
FIG. 2 is a schematic diagram of a control system of the vehicle.

As shown in FIG. 2, to permit measurement of the rotational speed of the wheels 12, the wheel speed sensor 28 may be associated with one of the wheels 12 to provide an output to the controller 22 that is indicative of the rotation of the wheel. By way of a non-limiting example, the wheel speed sensor 28 may be a hall effect sensor with a magnet being rotated with the wheel or spindle and with a sensing element used to detect the magnet as it rotates by the sensing element. Of course, other types of rotational speed sensors may be used.

Additionally, acceleration may be measured using the lateral accelerometer sensor 30 which measures gravitational forces (i.e., g-forces) in cross-car directions, and/or other directions. The vehicle 10 may include more than one lateral accelerometer 30 arranged in or on the vehicle 10. In at least one embodiment, the lateral accelerometer sensor 30 may be a multi-axis accelerometer which provides simultaneous measurement of acceleration in three perpendicular axes, for example. The lateral accelerometer 30 may measure normal acceleration which arises when the vehicle is turning a corner or switching lanes on the highway, for example.

To measure the position of wheels, the steering angle sensor 32 may be associated with one or more of the wheels 12 or with a steering shaft 34 of the vehicle 10. In at least one embodiment, the steering angle sensor may be a giant magnetoresistance (GMR) device, by way of one non-limiting example, that provides an absolute steering angle value over the complete steering angle range. Other types of sensors may be used, for example but not limited to, tunnel magnetoresistance (TMR) sensors and anisotropic magnetoresistance (AMR) sensors. The steering angle sensor 32 may provide an output that permits steering angle and/or steering angle velocity or rate of change of steering angle to be determined at the controller 22.

One or more systems of vehicle 10 may rely on the vehicle acceleration and/or steering angle data from the lateral accelerometer sensor 30 and/or steering angle sensor 32 during operation or during travel of the vehicle 10. Some systems may be on-board the vehicle 10 and some systems may be remote from the vehicle 10. For instance, anti-lock braking system (ABS), on-board diagnostic monitors (OBD), torque security features, and/or autonomous vehicle systems (AVS) may utilize some or all of the data from the lateral accelerometer 30 and/or steering angle sensor 32.

In the event of a malfunction of the lateral accelerometer 30 or steering angle sensor 32, the controller 22 may be configured to send or initiate diagnostic trouble codes (DTC) 36 so that a service technician can identify and diagnosis a specific issue. The controller 22 may additionally, or in the alternative, be configured illuminate a malfunction indicator lamp (MIL) 38 to help indicate a malfunction to a user.

Rationalization of one of the lateral accelerometer 30 or the steering angle sensor 32 with the other of the lateral accelerometer 30 or the steering angle sensor 32 may be performed on one or more and up to all of the lateral accelerometers and steering angle sensors of the vehicle 10. In general, rationalization may confirm whether the lateral accelerometer(s) 30 are providing some non-zero output, as a predominant failure mode of the lateral accelerometer 30 is a total failure in which the sensor provides only a zero output signal, suggesting no vehicle acceleration is occurring even when the vehicle 10 is accelerating or decelerating. Likewise, rationalization may confirm whether the steering angle sensor(s) 32 are providing some non-zero output, as a predominant failure mode of the steering angle sensor 32 is a total failure in which the sensor provides only a zero output signal, suggesting the wheels are straight when in fact the vehicle steering assembly (e.g. steering shaft 34) is turned to the left or right, for example.

As set forth herein, the rationalization process and method set forth herein may be used as a way to determine that one of the lateral accelerometer 30 or the steering angle sensor 32 are providing a signal without having to determine if the qualitative date from the other of the lateral accelerometer 30 or the steering angle sensor 32 is the same, or within some tolerance level. In other words, determining whether the value or magnitude of one of the lateral accelerometer or steering angle sensor is accurate with respect to the other of the lateral accelerometer 30 or steering angle sensor 32 is unnecessary. Instead, an efficient and economical manner to determine the most common fault or failure mode of the lateral accelerometer 30 and/or the steering angle sensor 32 may involve configuring the controller to require some output from one of the lateral accelerometer 30 and/or steering angle sensor 32 when there is a sufficient non-zero output from the other of the lateral accelerometer 30 or the steering angle sensor 32 during a qualifying wheel speed event.

The controller 22 may simultaneously receive and record data from the wheel speed sensor 28, lateral accelerometer 30, and the steering angle sensor while the vehicle 10 is moving as well as while the vehicle 10 is at rest. Electrical noise and vibrations, for example, may cause the lateral accelerometer 30 and/or steering angle sensor 32 to produce output signals at the controller 22 which in theory could result in a false indication lateral accelerometer sensor or steering angle failure. To ensure that diagnostic evaluation of the lateral accelerometer sensor 30 and/or the steering angle sensor 32 is robust, it may be desirable to configure the controller 22 to only assess and diagnose the lateral accelerometer 30 or steering angle sensor 32 when the wheel speed sensor output is of such a magnitude that some response output signal is expected from the lateral accelerometer 30 and/or the steering angle sensor 32 that is clearly distinguishable from a zero-output signal, and noise. This may be referred to the qualifying wheel speed event, as introduced above, or it may also be referred to as an evaluation event.

Figure 3:
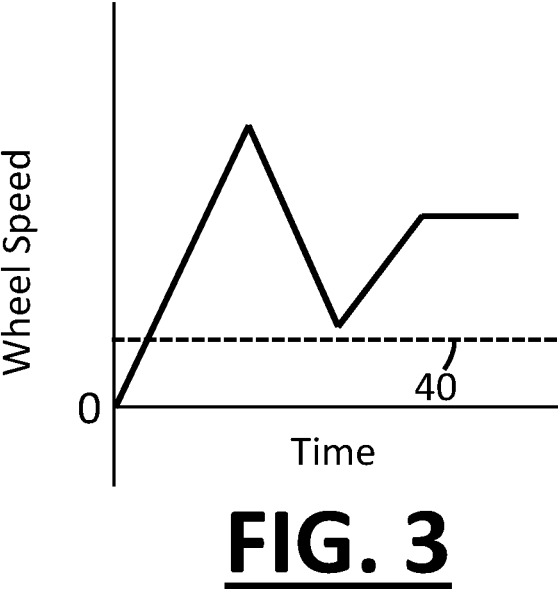
FIG. 3 is a graph of wheel speed over time.

In at least some implementations, a threshold may be used to ensure a sufficient acceleration event or steering event exists by which the operation of the lateral accelerometer 30 and/or steering angle sensor 32 can be checked. For example, in FIG. 3, a wheel speed threshold 40 or evaluation threshold, represented by a dashed line, which may relate to a minimum change in magnitude, may be used to determine whether a qualifying event exists for determining operation of the lateral accelerometer and/or steering angle sensor. In this example, to determine whether a sufficient evaluation event exists, wheel speed sensor data is monitored until the wheel speed exceeds the threshold 40, and in at least some implementations, the wheel speed threshold 40 must be exceeded for a certain, threshold amount of time. The evaluation threshold may be zero or a value greater than zero, for example. When the wheel speed exceeds the wheel speed threshold 40 for a threshold amount of time, the system may then look to the lateral accelerometer output and the steering angle sensor output to evaluate the operation of one or both of the sensors 30, 32.

Figure 4:
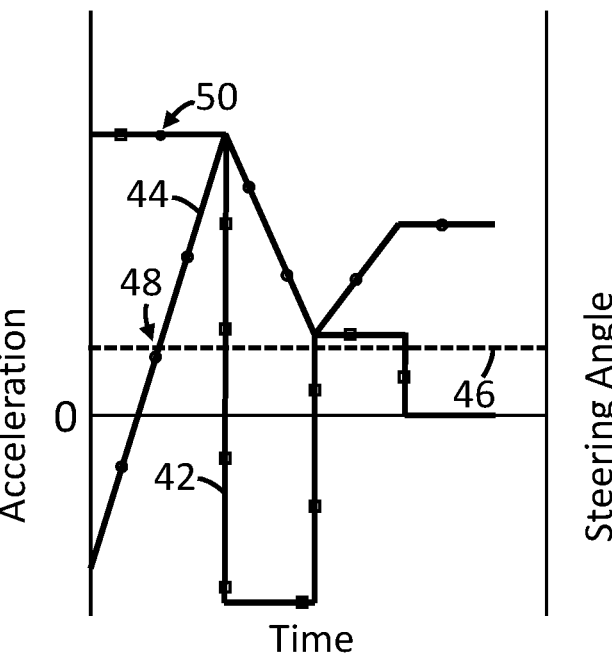
FIG. 4 is a graph of acceleration over time and steering angle over time.

With reference to the example shown in FIG. 4, lateral accelerometer data from the lateral accelerometer sensor 30 is plotted on line 42 which includes rectangles along the line, and steering angle is shown by line 34 which includes circles along the line for ease in differentiating the two lines. A steering angle threshold 46 is shown by a dashed line. When evaluating the operation of the lateral accelerometer 30 during an evaluation event, the controller 22 may be configured to consider the output of the steering angle sensor 30 so that once the steering angle threshold 46 is exceeded (e.g., at reference numeral 48), a lateral accelerometer evaluation value 50 is simultaneously recorded. The lateral accelerometer evaluation value 50 may be used to determine whether the lateral accelerometer 30 is properly responding.

Figure 5:
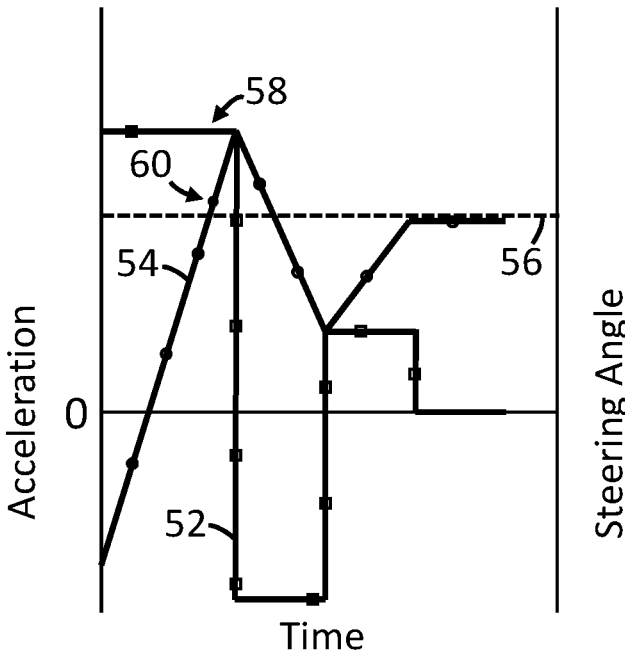
FIG. 5 is a graph of acceleration over time and steering angle over time.

With reference to the example shown in FIG. 5, lateral accelerometer data from the lateral accelerometer sensor 30 is plotted on line 52 which includes rectangles along the line, and steering angle is shown by line 54 which includes circles along the line for ease in differentiating the two lines. A lateral acceleration threshold 56 is shown by a dashed line. When evaluating the operation of the steering angle sensor 32 during an evaluation event, the controller 22 may be configured to consider the output of the lateral accelerometer 30 so that once the lateral acceleration threshold 56 is exceeded (e.g., at reference numeral 58), a steering angle sensor evaluation value 60 is simultaneously recorded. The steering angle sensor evaluation value 60 may be used to determine whether the steering angle sensor 32 is properly responding.

Figure 6:
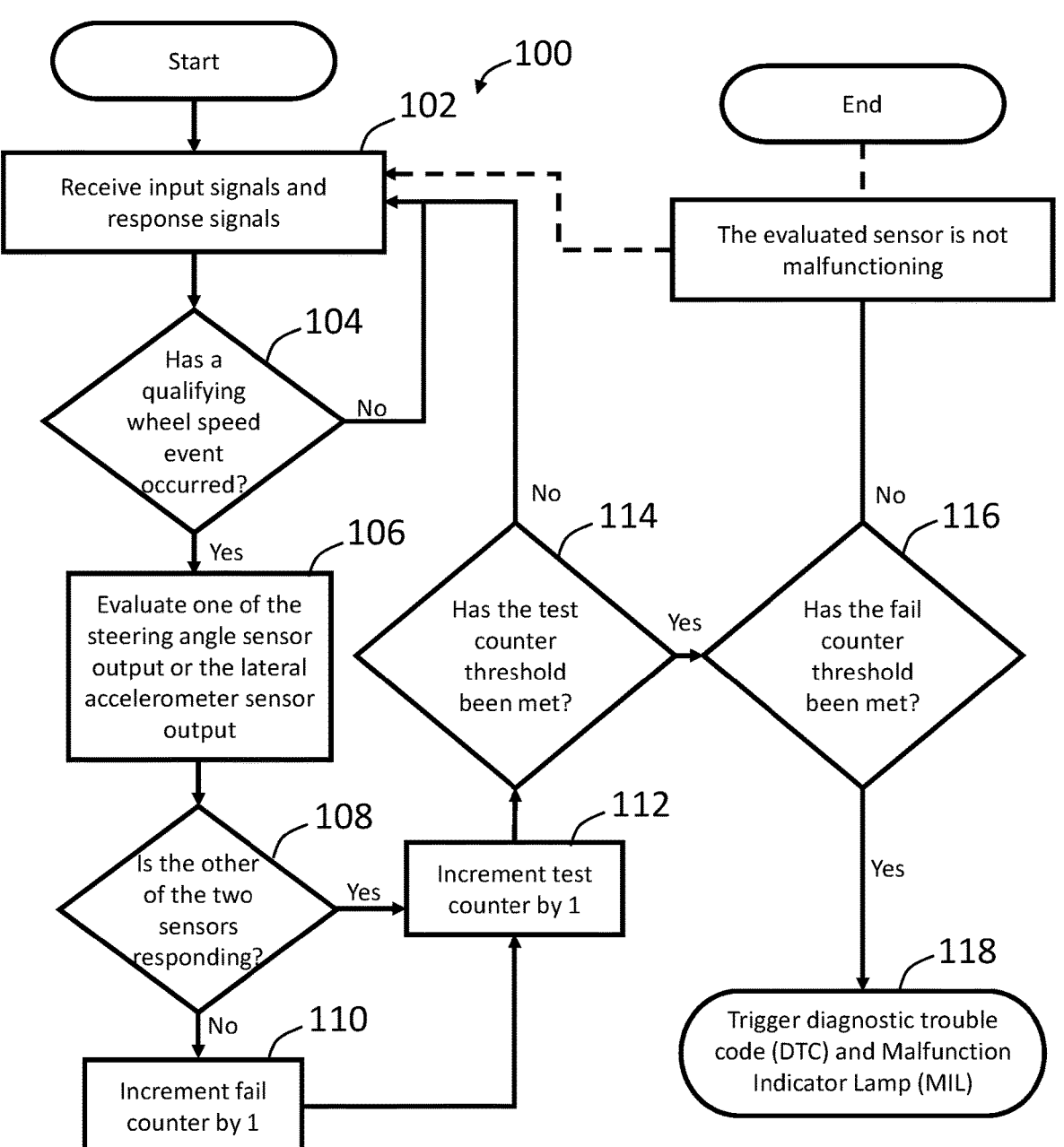
FIG. 6 is a flow chart of a method of rationalizing a lateral accelerometer with a steering angle sensor and/or rationalizing the steering angle sensor with the lateral accelerometer.

FIG. 6 is a flowchart of a method 100 for rationalizing performance of one of the lateral accelerometer 30 or steering angle sensor 62 with the other of the lateral accelerometer 30 or steering angle sensor 32. The method 100 begins with step 102 where output signals from the one or more wheel speed sensors 28, the lateral accelerometer 30, and the steering angle sensor 32 may be provided to and received at the controller 22. The wheel speed sensor output may be received at the controller 22 as an input signal. The lateral accelerometer sensor output may be received at the controller 22 as an input signal or response signal. The steering angle sensor output may be received at the controller 22 as an input signal or a response signal.

In step 104 of method 100, depending on how the controller 22 is configured, the controller 22 may evaluate the signals received and determine whether a sufficient evaluation event has occurred. This may be done as described with reference to FIG. 3, and with regard to one or more wheel speed thresholds 40. If it is determined that a qualifying wheel speed event has not occurred, for example because the wheel speed sensor output does not meet the criteria, then in step 104 the method returns to step 102 and the controller 22 will continue to receive data from the wheel speed sensor 28 until a sufficient evaluation event exists at which time the method continues to step 106.

In step 106, the controller 22 assesses one of the lateral accelerometer sensor or the steering angle sensor data. If, in step 106, the controller 22 is evaluating the steering angle sensor output data then the controller 22 considers whether the lateral acceleration threshold 56 has been exceeded as shown in FIG. 5. At this time, if the lateral acceleration threshold 56 is met or exceeded, then the steering angle evaluation value 60 is recorded and compared to a first or steering angle test threshold. The first or steering angle test threshold may be zero or a value greater than zero. Likewise, if, in step 106, the controller 22 is evaluating the lateral accelerometer data output data then the controller 22 considers whether the steering angle threshold 46 has been exceeded, as shown in FIG. 4. At this time, if the steering angle threshold 46 is met or exceeded, then the lateral accelerometer evaluation value 50 is recorded and compared to a second or lateral accelerometer test threshold. The second or lateral accelerometer test threshold may be zero or a value greater than zero. After evaluating one of the lateral accelerometer sensor data or the steering angle sensor data, the method 100 may continue to step 108 in which the controller 22 determines whether the other of the lateral accelerometer sensor 30 or the steering angle sensor 32 is responding properly.

In step 108, depending on which sensor is being evaluated, the steering angle sensor evaluation value 60 may be compared to the steering angle test threshold and/or the lateral accelerometer sensor evaluation value 50 may be compared to the lateral accelerometer test threshold to determine if the evaluation values are greater than the test values. So, if the steering angle evaluation value is zero, not equal to, or less than the steering angle test threshold, then the method continues to step 110 and a "fail counter" for the steering angle sensor is incremented by one as a result of the steering angle sensor data not meeting the steering angle test value criteria. If the lateral accelerometer evaluation value is zero, not equal to, or less than the lateral accelerometer test threshold, then the method continues to step 110 and a "fail counter" for the steering angle sensor is incremented by one as a result of the lateral accelerometer sensor data not meeting the lateral accelerometer test value criteria. The method 100 then continues to step 112 in which a "test counter" for the sensor being evaluated is incremented by one indicating completion of a first test of the lateral accelerometer sensor 30 or steering angle sensor 32. If, on the other hand, the evaluation value found in step 108 is equal to or greater than its respective test value for the sensor being evaluated, then the sensor being evaluated is determined to be functioning properly and the method 100 proceeds directly to step 114 where only the test counter is incremented by one indicating completion of a successful test.

The controller 22 may be programmed to include test count thresholds that must be met (e.g., 2 to 10, by way of non-limiting examples) before the fail counter is evaluated to determine whether a malfunction of the lateral accelerometer 30 and/or the steering angle sensor 32 exists. This can be done to ensure that a desired number of tests have been completed to provide greater confidence in the result. The method 100 may continue to step 116, in which it is determined if the test counter threshold has been met. If the test counter threshold has not been met then the method 100 returns to step 102 to begin another test. If the test counter threshold has been met, then that indicates that there is sufficient data for the controller 22 to make a determination as to the operation of the lateral accelerometer sensor 30 or the steering angle sensor 32 and the method continues to step 116.

In step 116, the controller 22 checks the fail counter against a fail counter threshold to determine if a sufficient number of tests indicating failure of the lateral accelerometer sensor 30 or the steering angle sensor 32 has occurred to determine that the lateral accelerometer sensor 30 or the steering angle sensor 32 is not functioning or is not functioning properly. This may be desirable ensure that the method 100 is robust and only indicates a malfunction when multiple tests indicate sensor malfunction. If, in step 116, the fail counter does not exceed the fail counter threshold then the controller 22 determines that the lateral accelerometer 30 or the steering angle sensor 32 is not malfunctioning and the method 100 either ends or returns to step 102 (as shown by the dashed lines in FIG. 6) to start a new sequence of tests, if desired. If, in step 116, the fail counter exceeds the fail counter threshold then the method continues to step 118 in which an error is indicated, such as a diagnostic trouble code 36 (DTC) or illumination of a corresponding malfunction indicator lamp 38. The DTC 36 may be an error code which may be read by a service technician and the malfunction indicator lamp 38 (e.g., check engine light) may be provided to indicate to a user that the vehicle 10 needs to be serviced.

The fail counter threshold may be set at any desired level relative to the test counter threshold. For example, if the test counter threshold is set to 10, then the fail counter threshold may be 10 or a number less than 10. In at least some implementations, the fail counter threshold value is 100% of the test counter threshold value over the course of at least 3 to 5 tests per vehicle trip, for example.

Of course, a test counter and/or fail counter is not needed and a single malfunction of a lateral accelerometer sensor 30 or the steering angle sensor 32 may cause an error to be indicated by the system, if desired. Further, the test and fail counters may be reset at any desired interval, including when the vehicle 10 is shutdown after use, or at any other time such as after a threshold number of tests have been run without a threshold number of failures being indicated. For example. the counter may be reset during any conditions other than a key cycle. A "key cycle" refers to an engine/vehicle key-on followed by an engine/vehicle key-off. Also, the method 100 may be run at any desired frequency or interval, as the vehicle 10 is being used, as desired. For instance, the method 100 may run at least once per trip and evaluate the operation of the lateral accelerometer sensor 30 and/or the steering angle sensor 32 if the qualifying wheel speed event conditions are met.

What is claimed is:

1. A method of rationalizing a sensor of a vehicle, the method comprising the steps of:
   receiving an output from a wheel speed sensor;
   receiving an output from a lateral accelerometer;
   receiving an output from a steering angle sensor;
   determining whether an evaluation event exists based on the output from the wheel speed sensor;
   evaluating one of the steering angle sensor output or the lateral accelerometer sensor output during the evaluation event; and
   determining whether the other of the steering angle sensor output or the lateral accelerometer sensor output exceeds a test threshold value during the evaluation event.

2. The method of claim 1, wherein the evaluation event exists when the output from the wheel speed sensor exceeds an evaluation threshold.

3. The method of claim 2, wherein the evaluation threshold is zero.

4. The method of claim 2, wherein the lateral accelerometer is determined to be malfunctioning when the steering angle sensor output indicates a steering maneuver and the lateral accelerometer evaluation value does not exceed the test threshold value for the lateral accelerometer.

5. The method of claim 4, wherein the test threshold is greater than zero by at least a nominal noise value for the lateral accelerometer sensor output.

6. The method of claim 5, further comprising a step of providing an indication of an error when the lateral accelerometer sensor output does not exceed the test threshold during the evaluation event.

7. The method of claim 5, wherein the test threshold does not vary as a function of the magnitude of the output of the steering angle sensor output.

8. The method of claim 2, wherein the lateral accelerometer is determined to not be malfunctioning when the steering angle sensor output indicates a steering maneuver and the lateral accelerometer sensor output exceeds the test threshold value for the lateral accelerometer.

9. The method of claim 2, wherein the steering angle sensor is determined to be malfunctioning when the lateral accelerometer sensor output indicates a change in acceleration and the steering angle sensor output does not exceed test threshold for the steering angle sensor.

10. The method of claim 9, wherein the test threshold value is greater than zero by at least a nominal noise value for the steering angle sensor output.

11. The method of claim 10, wherein the test threshold does not vary as a function of the magnitude of the output of the lateral accelerometer sensor output.

12. The method of claim 9, further comprising a step of providing an indication of an error when the steering angle sensor output does not exceed the test threshold during the evaluation event.

13. The method of claim 2, wherein the steering angle sensor is determined to not be malfunctioning when the lateral accelerometer sensor output indicates a change in acceleration and the steering angle sensor output exceeds the test threshold.

14. A vehicle system, comprising:
   a wheel speed sensor adapted to sense a wheel speed and to provide an output indicative of the magnitude of wheel speed;
   a lateral accelerometer adapted to sense an acceleration of a vehicle and to provide an output indicative of the magnitude of vehicle acceleration;

a steering angle sensor adapted to provide steering wheel data and provide an output indicative of steering wheel position; and a controller communicatively coupled with the wheel speed sensor, the lateral accelerometer, and the steering angle sensor and adapted to:

receive an output from the wheel speed sensor;

receive an output from the lateral accelerometer;

receive an output from the steering angle sensor;

determine whether an evaluation event exists that exceeds an evaluation event value based on the output from the wheel speed sensor;

evaluate one of the steering angle sensor output or the lateral accelerometer sensor output during the evaluation event; and determine whether the other of the steering angle sensor output or the lateral accelerometer sensor output exceeds a non-zero value during the evaluation event.

15. The system of claim 14, wherein the vehicle includes multiple wheels and a separate wheel speed sensor is provided for each wheel of the vehicle.

16. The system of claim 14 wherein the non-zero value is a test threshold greater than zero.

17. The system of claim 16 wherein the test thresholds do not vary as a function of the magnitude of the output of the wheel speed sensor.

* * * * *